(12) United States Patent
Hiemstra et al.

(10) Patent No.: US 12,451,969 B2
(45) Date of Patent: Oct. 21, 2025

(54) SELF-COMPENSATING POLARIZATION MODULATOR HAVING DIRECTIONAL PHASE SHIFTER

(71) Applicant: Tesat-Spacecom GmbH & Co. KG, Backnang (DE)

(72) Inventors: Thomas Hiemstra, Backnang (DE); Julian Struck, Backnang (DE)

(73) Assignee: Tesat-Spacecom GmbH & Co. KG, Backnang (DE)

( * ) Notice: Subject to any disclaimer, the term of this patent is extended or adjusted under 35 U.S.C. 154(b) by 263 days.

(21) Appl. No.: 18/235,021

(22) Filed: Aug. 17, 2023

(65) Prior Publication Data

US 2024/0072904 A1 Feb. 29, 2024

(30) Foreign Application Priority Data

Aug. 25, 2022 (DE) .................. 102022121510.5

(51) Int. Cl.
*H04B 10/50* (2013.01)
*G02F 1/01* (2006.01)
*H04B 10/532* (2013.01)
*H04B 10/11* (2013.01)
*H04B 10/118* (2013.01)
(Continued)

(52) U.S. Cl.
CPC ......... *H04B 10/532* (2013.01); *G02F 1/0121* (2013.01); *G02F 1/0136* (2013.01); *H04B 10/11* (2013.01); *H04B 10/118* (2013.01); *H04B 10/50* (2013.01); *H04B 10/516* (2013.01); *H04B 10/548* (2013.01)

(58) Field of Classification Search
CPC .... H04B 10/532; H04B 10/11; H04B 10/118; H04B 10/50; H04B 10/516; H04B 10/548; H04B 10/5561; G02F 1/0121; G02F 1/0136
USPC .................. 398/118–131, 140–172, 182–201
See application file for complete search history.

(56) References Cited

U.S. PATENT DOCUMENTS 5,311,592 A * 5/1994 Udd ................. G01M 11/39
380/54
5,495,366 A * 2/1996 Esman ................ G01D 5/344
359/489.08
(Continued)

FOREIGN PATENT DOCUMENTS

CN 110361876 A 10/2019

*Primary Examiner* — Dibson J Sanchez
(74) *Attorney, Agent, or Firm* — Lerner David LLP

(57) ABSTRACT

A modulator unit for modulating the phase of a polarization component of an optical signal contains a polarizing beam splitter and a phase shifter. The beam splitter splits an input signal into a first and a second polarization components having different polarization directions and sends the components in opposite directions via an optical ring containing the phase shifter. A polarization rotator is arranged in the optical ring, which changes the polarization direction of passing optical signals, so that the polarization components arriving at the phase shifter are polarized in the same direction. The phase shifter changes the polarization directions of the incoming optical signals such that they are polarized orthogonally to one another in the phase shifter. One polarization component is modulated. When the optical signals leave the phase shifter, their polarization direction is brought back to the original polarization direction.

10 Claims, 2 Drawing Sheets

(51) Int. Cl.
*H04B 10/516* (2013.01)
*H04B 10/548* (2013.01)

(56) References Cited

U.S. PATENT DOCUMENTS

| | | | | |
|---|---|---|---|---|
| 5,878,065 | A * | 3/1999 | Delavaux | H01S 3/1109 372/18 |
| 6,417,957 | B1 * | 7/2002 | Yao | H04B 10/2916 359/334 |
| 6,879,433 | B1 * | 4/2005 | Yamashita | G02F 1/3536 359/332 |
| 7,974,540 | B2 * | 7/2011 | Tomita | H04L 9/0858 380/278 |
| 8,818,203 | B2 * | 8/2014 | Ji | G02B 6/30 398/189 |
| 9,647,426 | B1 * | 5/2017 | Fish | G02B 27/283 |
| 10,790,911 | B2 * | 9/2020 | Li | H04B 10/616 |
| 2002/0044318 | A1 * | 4/2002 | Hung | H04J 14/0307 385/24 |
| 2004/0005056 | A1 * | 1/2004 | Nishioka | H04L 9/0858 380/256 |
| 2004/0190107 | A1 * | 9/2004 | Hiironen | G02F 1/09 359/280 |
| 2010/0067923 | A1 | 3/2010 | Arahira | |
| 2012/0001625 | A1 * | 1/2012 | Yamada | G02F 1/0036 324/244.1 |
| 2012/0189238 | A1 * | 7/2012 | Ruchet | G02B 6/2935 385/11 |
| 2016/0337041 | A1 * | 11/2016 | Wen | H04B 10/2575 |
| 2018/0143460 | A1 * | 5/2018 | Wen | G02B 27/286 |
| 2018/0217468 | A1 * | 8/2018 | Wen | H04B 10/5561 |
| 2019/0222416 | A1 * | 7/2019 | Liang | G02B 6/2746 |
| 2019/0260478 | A1 * | 8/2019 | Lucamarini | H04B 10/548 |
| 2024/0129040 | A1 * | 4/2024 | Vallone | H04B 10/532 |

\* cited by examiner

SELF-COMPENSATING POLARIZATION MODULATOR HAVING DIRECTIONAL PHASE SHIFTER

FIELD OF THE INVENTION

The present description relates to optical signal generation and signal transmission, in particular the transmission of information by means of polarization modulation. The description especially relates to a modulator unit for modulating the phase of a polarization component of an optical signal, an optical signal transmission link having such a modulator unit, and a system having such a modulator unit, for example, in the form of a satellite.

BACKGROUND OF THE INVENTION

Information can be transmitted using technical means in that an information unit is assigned to a specific state of a carrier signal. The carrier signal is typically an electromagnetic wave from a specific spectral range. To apply information to the carrier signal, a property of the carrier signal is changed. The change as such or the state of the carrier signal after the change corresponds here to the information to be transmitted. The carrier signal is typically changed in time intervals in order to transmit multiple information units in this way.

Depending on the carrier signal, various physical features of the carrier signal come into consideration as information carriers, for example: the amplitude, the frequency, the phase, and/or the polarization. If one of these features is changed over time, this procedure is referred to as modulation.

Various technical components are used on the signal processing path in order to process the carrier signal and introduce the desired information into the carrier signal before the carrier signal is transmitted via the transmission link (in a wired or wireless manner).

The components used in the preparation and processing of the carrier signal serve to modulate the carrier signal accordingly, so that the information to be transmitted is applied correctly to the carrier signal and is transmitted with as little interference and loss as possible via the transmission link.

However, it can happen that in addition to the desired modulation (change of the carrier signal), undesired changes of the carrier signal also take place, for example, due to parasitic effects or other undesired properties of the components involved in the preparation of the carrier signal. In this case, it is not always recognizable at a receiver of the carrier signal which change of the carrier signal is based on the desired modulation and which change was induced by undesired effects. The quality of the signal can thus be negatively influenced.

BRIEF SUMMARY OF THE INVENTION

Proceeding therefrom, an aspect relates to reducing or eliminating the influence of undesired effects of a modulator unit on a carrier signal modulated for transmission. In particular, an aspect relates to avoiding polarization errors in a polarization-modulated optical signal.

According to one aspect, a modulator unit for modulating the phase of a polarization component of an optical signal is specified. The modulator unit includes a light source, a polarizing beam splitter, and a phase shifter. The light source is designed to output an optical signal and emit it as an input signal in the direction of the polarizing beam splitter, wherein the optical signal contains a first polarization component having a first polarization direction and a second polarization component having a second polarization direction. The polarizing beam splitter is designed to split the input signal into the first polarization component and the second polarization component, to conduct the first polarization component via a first optical partial link in a first direction to the phase shifter, and to conduct the second polarization component via a second optical partial link in a second direction to the phase shifter, wherein the second direction is opposite to the first direction, so that the first polarization component and the second polarization component pass through the phase shifter in opposite directions. The first optical partial link or the second optical partial link contains a polarization rotator, which is designed to change a polarization direction of optical signals that pass the polarization rotator so that the first polarization component has the same polarization direction as the second polarization component when the first polarization component and the second polarization component are incident on the phase shifter. The phase shifter includes a first Faraday rotator, a second Faraday rotator, and a polarization-dependent phase modulator. The polarization-dependent phase modulator is arranged along an optical path through the phase shifter between the first Faraday rotator and the second Faraday rotator. The first optical partial link is optically coupled to the first Faraday rotator and the second optical partial link is optically coupled to the second Faraday rotator. The first Faraday rotator is configured such that it changes a polarization direction of passing optical signals in a first polarization change direction and the second Faraday rotator is configured such that it changes a polarization direction of passing optical signals, such as light, in a second polarization change direction. The second polarization change direction is different from the first polarization change direction, so that the first polarization component and the second polarization component, when they pass the polarization-dependent phase modulator, are polarized in polarization directions perpendicular to one another. The polarization-dependent phase modulator is designed to execute a phase modulation of only one polarization component. The polarizing beam splitter is arranged to receive the first polarization component via the second optical partial link and to receive the second polarization component via the first optical partial link, and to combine the first polarization component and the second polarization component to form a superimposed optical signal.

The optical signal as output by the light source thus contains differently polarized components. The differently polarized components are designated here as the first polarization component and second polarization components having the respective polarization direction. It is to be noted that in the processing of the optical signal in the modulator unit, the polarization direction of the polarization components changes, because of which reference is made in the description for better comprehension to both the first/second polarization components and the first/second polarization direction.

The polarizing beam splitter receives the input signal having the superimposed two polarization components. One polarization component having a first polarization direction passes the polarizing beam splitter and the other polarization component having a second polarization direction is deflected by the polarizing beam splitter. The input signal is therefore split as a function of the polarization direction of the polarization components and the polarization components thus split are conducted via different optical partial links and in different directions to the phase shifter. As a result, however, both polarization components pass through both optical partial links in opposite directions. The two polarization components are initially each fed here into one optical partial link and conducted to the phase shifter. After the polarization components have passed the phase shifter, the polarization components are put into the respective other optical partial link and led back to the polarizing beam splitter.

In other words, the polarizing beam splitter together with the phase shifter and the first and second optical partial link forms an optical ring. The optical signals are fed into the optical ring and also output from the optical ring at the polarizing beam splitter. The optical signal having the superimposed polarization components is split at the polarized beam splitter as a function of the polarization direction. The two polarization components are led in opposite directions through the optical ring. In this case, one polarization component is modulated in the phase shifter. The two polarization components are then superimposed again at the polarizing beam splitter to form an optical signal. The polarization-dependent phase modulator acts only on one polarization component having a specific polarization direction and lets the other polarization component having a different polarization direction pass unchanged with respect to its phase. The phase shifter is thus a direction-dependent phase shifter.

A polarization rotator is arranged in one of the optical partial links. The task of the polarization rotator is to change the polarization direction of an optical signal on the corresponding optical partial link. In particular, the polarization direction is changed so that both polarization components have the same polarization direction after the change of the polarization direction by the polarization rotator in the optical ring. Thus, when the first polarization component and the second polarization component are incident on the phase shifter, they have the same polarization direction. Both polarization components therefore also pass through a large part of the optical ring in a state in which they have the same polarization direction. Parasitic influences of the modulator unit, which are dependent on the polarization direction, thus act on both polarization components in the same manner and a differing influence of the modulator unit on the two polarization components is eliminated or greatly reduced, due to which modulation errors are also avoided.

To nonetheless be able to modulate information onto one polarization component and be able to change the polarization of the output optical signal, the polarization components are changed in the phase shifter with respect to their polarization direction. The first Faraday rotator is optically coupled to the first optical partial link and receives the first polarization component. The second Faraday rotator is optically coupled to the second optical partial link and receives the second polarization component. When the polarization components arrive at the respective Faraday rotator, they have the same polarization direction. The first Faraday rotator changes the polarization direction of the first polarization component in a first polarization change direction. The second Faraday rotator changes the polarization direction of the first polarization component in a second polarization change direction. For example, the first Faraday rotator changes the polarization direction of the first polarization component by 45° in a first direction (+45°) and the second Faraday rotator changes the polarization direction of the second polarization component by 45° in an opposite second direction (45°). The two polarization directions are therefore perpendicular to one another (90°) when the two polarization components pass the polarization-dependent phase modulator.

The effect described here can be achieved, for example, in that the first Faraday rotator and the second Faraday rotator operate using oppositely directed magnetic fields.

After the two polarization components have passed the respective Faraday rotator and the polarization-dependent phase modulator, they are led through the respective other Faraday rotator. Each polarization component experiences a change of the polarization direction in the opposite direction in this case, with respect to the direction in which the polarization is changed when a polarization component passes a Faraday rotator for the first time in each case. Each polarization component now again has the polarization direction which it had before the polarization component was incident on the phase shifter. The first polarization component now passes through the second optical partial link and the second polarization component passes through the first optical partial link. One of the two polarization components experiences a further change of the polarization direction by the polarization rotator on one optical partial link. After the first and second polarization components have completely passed through the optical ring, they meet one another at the polarizing beam splitter. The polarization components are distinguished by a respective intrinsic phase location or a relative phase difference. At the polarizing beam splitter, the first and second polarization component are superimposed and output as a modulated output signal. The superimposed optical signal contains the information in the polarization as the superposition of the two polarization components, of which one is phase modulated.

A reference to the optical path in the phase shifter relates to the path of the optical signals through the phase shifter and the functional arrangement of the components of the phase shifter. The first polarization component arrives via the first optical partial link at a first terminal at the phase shifter and then passes through the first Faraday rotator, the polarization-dependent phase modulator, and the second Faraday rotator in this sequence, before the first polarization component is output at a second terminal onto the second optical partial link. The second polarization component arrives via the second optical partial link at the second terminal at the phase shifter and passes through these in the opposite direction, thus initially the second Faraday rotator, then the polarization-dependent phase modulator, and last the first Faraday rotator, before the second polarization component is output at the first terminal onto the first optical partial link.

The optical signal which is used as the input signal represents, for example, the superposition of two orthogonal polarization components. The polarization-dependent phase modulator is designed to apply phase information to a polarization component.

In principle, the light source can be a light emitter (for example a laser) or the output of a light-guiding element.

A Faraday rotator is based on the Faraday effect. A magnetic field is applied at the Faraday rotator, by which the polarization is rotated as a function of the propagation direction of the magnetic field. The Faraday rotator can be designed so that it changes the polarization direction by a specific value, for example, +450 or −45°.

With the exception of the polarization-dependent phase modulator, both polarization components pass through the same optical path (the above-mentioned optical ring) with the same polarization directions. Parasitic influences of the modulator unit on the phase of the optical signal and error phases are thus eliminated, in particular phase errors which occur due to thermal and mechanical fluctuations of the modulator unit.

The polarization-dependent phase modulator used here is a phase-changing modulator, which acts on a polarization component having a specific polarization direction of an optical signal, i.e., the polarization-dependent phase modulator changes the phase of a polarization component, due to which the relative phase between two polarization components of the optical light orthogonal to one another also changes. For example, the polarization-dependent phase modulator is an electro-optical modulator, EOM. It is to be understood that any reference to an EOM in this description is only by way of example and applies in principle to a polarization-dependent phase modulator.

For example, the polarization-dependent phase modulator has two optical axes aligned orthogonally to one another. By means of electrical energy, for example, an applied voltage along one of these optical axes, its index of refraction is modified and a phase change of the polarization component of the optical signal in relation to the other or orthogonal optical axis results.

Various polarization states of an optical signal may be set using the modulator unit described here. Various discrete states of the polarization can be set in this case, for example, in that the phase of, for example, a horizontally polarized component of the optical signal is changed with respect to the phase of, for example, a vertically polarized component of the optical signal. The polarization of the optical signal can be continuously changed arbitrarily in principle, however, without being limited to a restricted number of polarization states.

Overall, the polarization of the output signal of the modulator unit is freely settable between two linear polarizations (for example, horizontal, vertical) and two circular polarizations (for example, Z+ and Z−). The polarization can also be set continuously to all elliptical states lying between the discrete states, however.

According to one embodiment, the first Faraday rotator is configured such that it changes the polarization direction of passing optical signals in the first polarization change direction by 45°, wherein the second Faraday rotator is configured such that it changes the polarization direction of passing optical signals in the second polarization change direction by 45°, wherein the first polarization change direction is opposite to the second polarization change direction.

Due to this design, the polarization directions of the two polarization components are orthogonal to one another when the polarization components pass the polarization-dependent phase modulator in opposite directions. The polarization-dependent phase modulator therefore acts only on one of the two polarization components.

According to a further embodiment, the polarization rotator is a half-wave plate or an optical fiber, which is arranged and designed such that it changes the polarization direction of the passing optical signal.

The task of the polarization rotator is to bring one of the two polarization components into the polarization direction of the other polarization component when the two polarization components are fed into the optical ring. Therefore, both polarization components pass through the optical ring having the same polarization direction (except for the polarization-dependent phase modulator). On the output side, i.e., when the two polarization components leave the optical ring, the polarization direction of one polarization component is again changed such that the superimposed optical signal contains two polarization components having different polarization direction. The polarization rotator changes the polarization direction of both the fed-in polarization component and also the output polarization component.

The half-wave plate can be replaced by the pivot of a polarization-maintaining optical fiber.

According to a further embodiment, the first optical partial link and/or the second optical partial link is implemented as a free space structure or as an optical waveguide, for example, in the form of an optical fiber.

This means that the polarization components output by the polarizing beam splitter are transmitted either without dedicated transmission medium (i.e., through the air or through vacuum) or with the aid of optical waveguides to the phase shifter. In the case of a free space structure, one or more mirrors can be used on each of the optical partial links to guide the respective optical signal on the optical partial link to the phase shifter. In contrast, if optical waveguides are used, polarization-maintaining waveguides are advantageously used.

According to a further embodiment, the polarization-dependent phase modulator includes a crystal, which is designed to be subjected to an electrical voltage and to change its index of refraction in this case, by which the phase of the first polarization component of the optical signal is changed. However, the index of refraction can also be changed in that the index of refraction of one optical axis is varied relative to another optical axis. This can take place, for example, in that a mechanical stress is applied.

The polarization-dependent phase modulator can contain, for example, a birefringent medium, which changes the phase of an optical signal passing through the optical medium upon application of a voltage.

According to a further embodiment, the modulator unit is designed to vary the electrical voltage applied to the crystal over time.

For example, the modulator unit contains an energy supply which provides a specifiable electrical voltage. A control unit activates the energy supply so that the latter provides a desired electrical voltage at the polarization-dependent phase modulator. The phase between differently polarized components of the optical signal is changed by the electrical voltage varying over time at the polarization-dependent phase modulator.

According to a further embodiment, the light source is designed to output light having a defined optical mode.

In the present context, the polarization and coherence properties of the optical signal are important. For example, the light source is a laser.

Lasers are distinguished in that they can emit optical signals having a well-defined polarization. They are therefore suitable in particular for applications as described here.

According to a further embodiment, the modulator unit is designed to activate the light source so that the light source emits continuous or pulsed optical signals.

According to a further embodiment, the modulator unit furthermore includes a feed unit, which is designed in particular as a non-polarizing beam splitter or circulator.

The feed unit is arranged between the light source and the polarizing beam splitter and is designed to guide at least a part of the input signal emitted by the light source to the polarizing beam splitter. On the output side, the feed unit is designed to receive the optical signal phase modulated by the phase shifter and superimposed by the polarizing beam splitter and guide it in a predetermined direction.

The feed unit is designed to guide the optical signal output by the polarizing beam splitter at least partially structurally in a desired direction so that the optical signal output by the polarizing beam splitter is not emitted exclusively in the direction of the light source which provides the input signal. The output signal thus generated carries information in its polarization, which can be read out and processed on the part of a receiver.

According to a further aspect, an optical signal transmission link is specified. The optical signal transmission link includes a modulator unit as described herein and a receiver. The modulator unit functions as a signal source or part of a transmitting unit, which outputs an optical signal to which information is applied. The signal source transmits the modulated optical signal in the direction of the receiver. The receiver is designed to receive optical signals. The modulator unit is arranged to emit the output signal in the direction of the receiver.

The signal transmission link can be designed for unidirectional or bidirectional signal transmission. In the case of bidirectional signal transmission, there are at least two communication units which both include a modulator unit and also a receiving unit.

The modulator unit described herein is implemented as part of an optical signal transmission link. The optical signal transmission link is therefore configured to transmit information by means of polarization modulation of an optical carrier signal. The polarization modulation is introduced by means of the modulator unit into the optical carrier signal. The modulator unit compensates for phase errors due to the components participating in the modulation intrinsically, because two polarization components of the optical signal pass through the optical ring in opposite directions and one polarization component is modulated by the phase shifter.

According to one embodiment, the modulator unit is arranged in a satellite. However, the modulator unit can be arranged in any other communication system.

According to a further aspect, a satellite having a modulator unit as described herein is specified.

A modulator unit as described herein can be used, for example, on optical signal transmission links which are used between two mobile units (air, water, or land vehicles or satellites), between a mobile unit and a remote station on the Earth's surface, or between two stationary units.

BRIEF DESCRIPTION OF THE DRAWINGS

Exemplary embodiments are described in more detail hereinafter on the basis of the appended drawings. The illustrations are schematic and are not to scale. Identical reference signs relate to identical or similar elements. In the figures.

DETAILED DESCRIPTION

Figure 1:
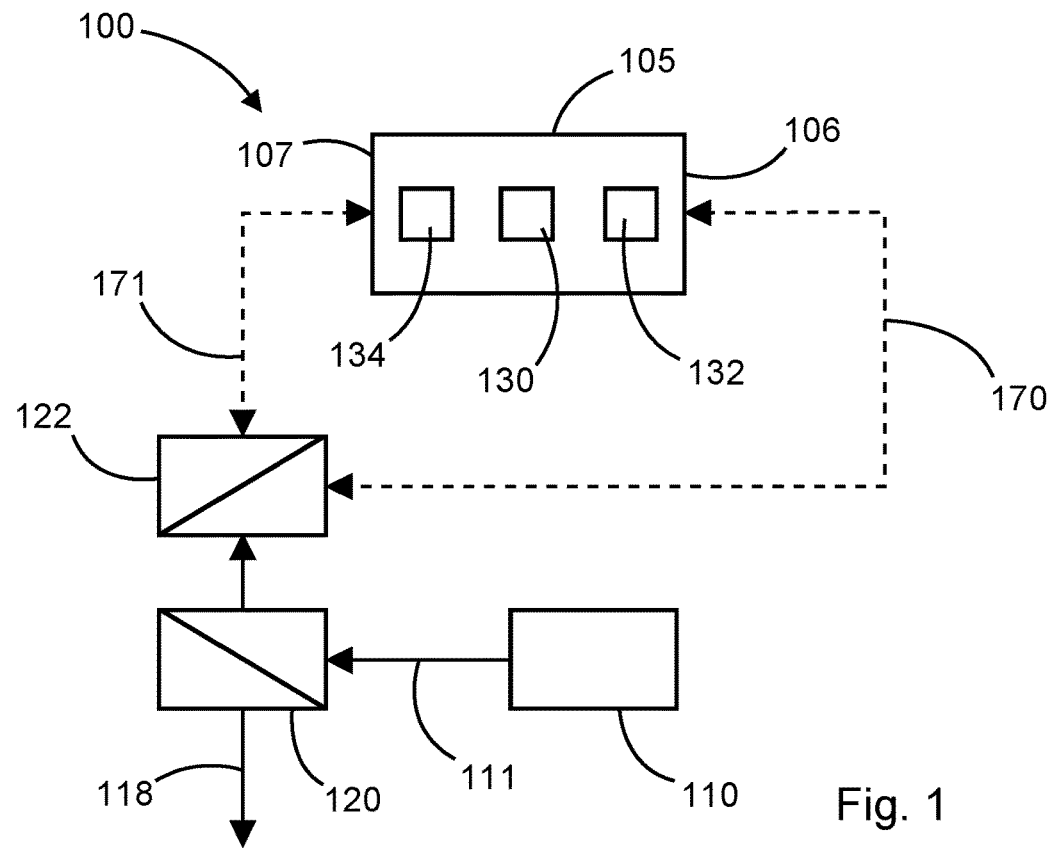
FIG. 1 shows a schematic illustration of a modulator unit.

FIG. 1 shows the structural design of a modulator unit 100 according to one example. The modulator unit 100 in this example contains a light source 110, a non-polarizing beam splitter 120, a polarizing beam splitter 122, and a phase shifter 105. The phase shifter 105 contains a first Faraday rotator 132, a second Faraday rotator 134, and a polarization-dependent phase modulator 130 arranged in between. In this example, the polarization-dependent phase modulator 130 is an electro-optical modulator, EOM.

The light source 110, which is a laser, for example, emits an optical signal in the form of the input signal 111. This input signal is supplied to the remaining components and its polarization is modulated to transmit information via the optical signal.

The information to be transmitted is modulated onto the output signal 118 in the polarization of the optical signal.

The path of the optical signal through the modulator unit 100 therefore appears as follows: after the light source 110 emits the input signal 111, the input signal 111 is incident on the non-polarizing beam splitter 120. A part of the input signal 111 is conducted to the polarizing beam splitter 122. The polarizing beam splitter 122 splits the optical signal based on the polarization direction of the polarization components contained in the optical signal. The polarization component having a first polarization direction is transmitted in the illustration of FIG. 1 via the first optical partial link 170 to the phase shifter 105. The polarization component having a second polarization direction is transmitted in the illustration of FIG. 1 via the second optical partial link 171 to the phase shifter 105. The two polarization components pass through the phase shifter 105 in opposite directions and meet again on the polarizing beam splitter 122.

The way in which the polarization of the optical signal is modulated will now be described with reference to FIG. 2, which is to be considered in addition to FIG. 1.

Figure 2:
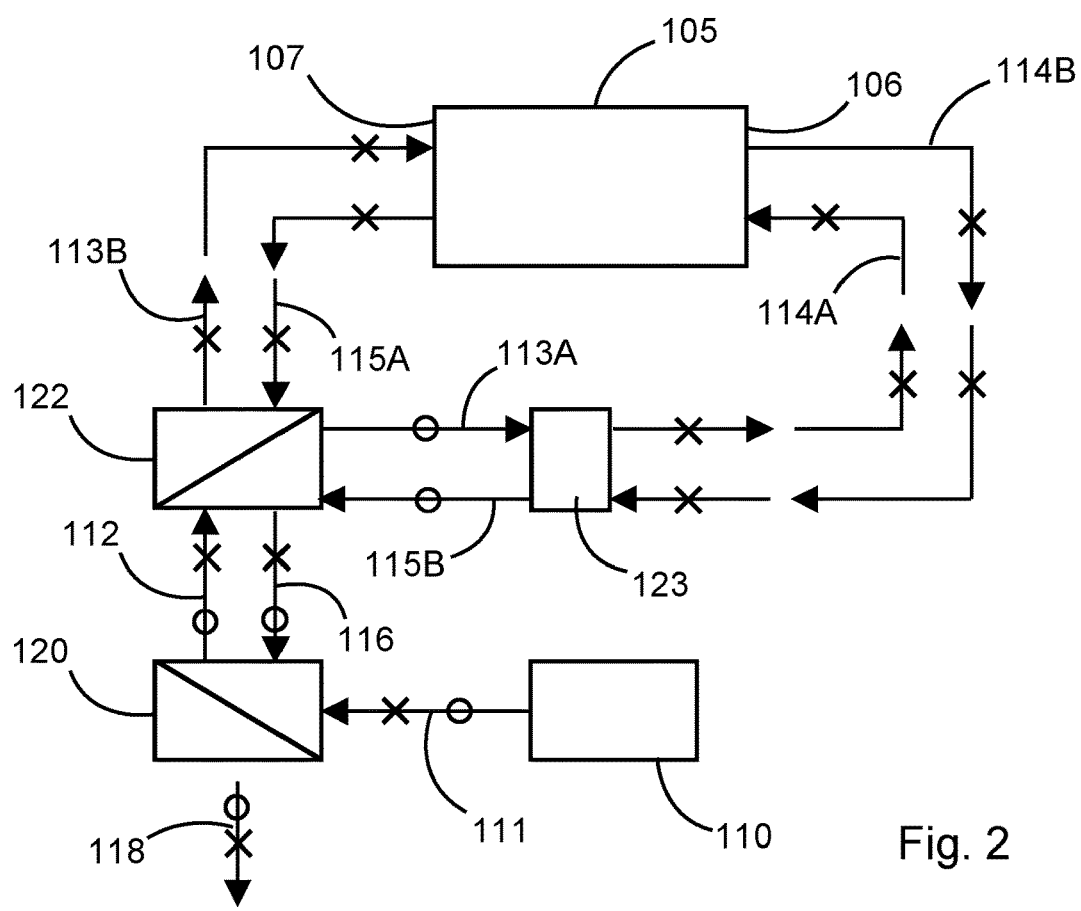
FIG. 2 shows a schematic illustration of the paths of the optical signal through a modulator unit.

The path of the optical signal through the modulator unit 100 is described in FIG. 2. The state of the optical signal at various points in time or at various points in the modulator unit 100 is referred to here.

The arrows shown in FIG. 2 each represent an optical signal and indicate which polarization components having which polarization direction the signal contains in each case. An arrow having a cross contains a polarization component having a first polarization direction. An arrow having a circle contains a polarization component having a second polarization direction. An arrow having a cross and a circle contains two polarization components, each of which has its own polarization direction.

The light source 110 emits the input signal 111, which contains two polarization components having their respective polarization directions. The input signal 111 is incident on the non-polarizing beam splitter 120, where the optical signal is deflected in the direction of the polarizing beam splitter 122. Between 120 and 122, the optical signal 112 also contains two polarization components having their respective polarization directions.

If the optical signal 112 is incident on the polarizing beam splitter 122, this optical signal 112 is thus split as a function of the polarization direction of the polarization components and fed into the optical ring (consisting of the first optical partial link 170, the phase shifter 105, and the second optical partial link 171). The first polarization component having first polarization direction 113A is fed to the right onto the first optical partial link 170 and the second polarization component having second polarization direction 113B is fed upward onto the second optical partial link 171. At this point in time, the optical signals 113A and 113B have different polarization directions.

On the first optical partial link 170, the optical signal 113A is incident on the polarization rotator 123. The polarization rotator 123 changes the polarization direction of the first polarization component such that the first polarization component 113A, after passing the polarization rotator 123, exits as the optical signal 114A and has the second polarization direction. The optical signal 114A thus has the same polarization direction as the second polarization component 113B on the second optical partial link 171.

Figure 3:
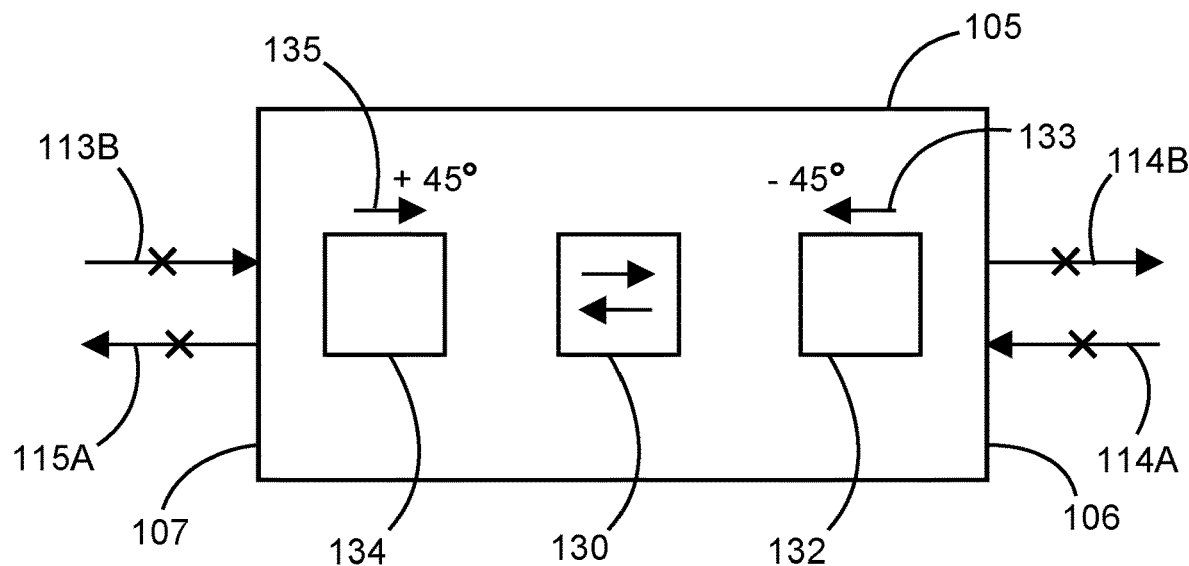
FIG. 3 shows a schematic illustration of a phase shifter.

The optical signal 114A is incident having the second polarization direction on the first terminal 106 of the phase shifter 105. The optical signal 113B is also incident having the second polarization direction on the second terminal 107 of the phase shifter 105. Reference is made to FIG. 3 with respect to the mode of operation of the phase shifter 105.

The first polarization component having second polarization direction 114A enters the phase shifter 105 at the first terminal 106, is processed therein (see description with reference to FIG. 3), and leaves the phase shifter 105 via the second terminal 107 in the direction of the second optical partial link 171, where the optical signal has the reference sign 115A and is incident on the polarizing beam splitter 122.

The second polarization component having second polarization direction 113B enters the phase shifter 105 at the second terminal 107, is processed therein (see description with reference to FIG. 3), and leaves the phase shifter 105 via the first terminal 106 in the direction of the first optical partial link 170, where the optical signal has the reference sign 114B and is incident first on the polarization rotator 123 and then on the polarizing beam splitter 122. When the optical signal 114B passes the polarization rotator 123 as the second polarization component having the second polarization direction, the polarization direction of the second polarization component changes and the optical signal is incident as the second polarization component having the first polarization direction 115B on the polarizing beam splitter 122.

The polarizing beam splitter 122 now superimposes the first polarization component having the second polarization direction 115A from the second optical partial link 171 with the second polarization component having the first polarization direction 115B from the first optical partial link 170. The superimposed optical signal 116, which now contains two polarization components having two polarization directions again, is produced in this case. The superimposed optical signal 116 is incident on the non-polarizing beam splitter 120. At this point, at least a part of the optical signal 116 leaves the non-polarizing beam splitter 120 as the output signal 118.

FIG. 3 shows a detailed illustration of the phase shifter 105. With respect to this illustration, first the path of the optical signal from the first optical partial link at the first terminal 106 to the second optical partial link at the second terminal 107 will be described.

On the right side, the first polarization component having the second polarization direction 114A is incident on the first terminal 106 of the phase shifter 105. This optical signal passes the first Faraday rotator 132, in which a first magnetic field 133 having a predetermined magnetic field direction acts on the optical signal, due to which the polarization direction of the first polarization component having the second polarization direction 114A is changed by −45°. The signal 114A is then fed into the polarization-dependent phase modulator 130 having the polarization direction thus changed.

On the left side, the second polarization component having the second polarization direction 113B is incident on the second terminal 107 of the phase shifter 105. This optical signal passes the second Faraday rotator 134, in which a second magnetic field 135 having a predetermined magnetic field direction (opposite to the magnetic field direction of the first magnetic field 133) acts on the corresponding optical signal, by which the polarization direction of the second polarization component having the second polarization direction 113B is changed by +45°. Having the polarization direction thus changed, the signal 113B is then fed into the polarization-dependent phase modulator 130.

In the polarization-dependent phase modulator 130, the signals 113B and 114A run in opposite directions and their polarization directions extend orthogonally to one another. The phase modulator 130 now modulates one polarization component having its polarization direction and lets the other polarization component pass unchanged with regard to its phase.

By way of example, it is assumed that the phase modulator 130 modulates the first polarization component 114A in its phase. After the first polarization component 114A has passed the phase modulator 130, this polarization component 114A also passes the second Faraday rotator 134. At this point, the polarization direction changes again, but in the opposite direction and by the same angle absolute value as in the first Faraday rotator 132. The signal now exits as the first polarization component 115A having the second polarization direction from the second terminal 107 and enters the second optical partial link 171. The first polarization component 115A now has the same polarization direction as it had on the first optical partial link, indicated by the reference sign 114A. However, the first polarization component 115A now contains a modulation introduced by the phase modulator 130.

Furthermore, in this example the second polarization component 113B passes the phase modulator 130 without change, because the polarization direction of the second polarization component 113B is orthogonal to the polarization direction of the first polarization component 114A and the phase modulator 130 therefore only acts on one polarization component. The second polarization component 113B passes the first Faraday rotator 132 having the first magnetic field 133 and brings the polarization direction of the second polarization component 113B back to the original direction. The corresponding optical signal now leaves the phase shifter 105 at the first terminal 106 as the second polarization component having the second polarization direction 114B.

The structure and the function of the phase shifter 105 can be described as follows in other words and in the example shown here: the phase shifter 105 contains a birefringent electro-optical modulator (EOM), which forms the polarization-dependent phase modulator 130, and which is arranged between two Faraday rotators having oppositely oriented magnetic fields. The Faraday rotators rotate the polarization state of the light here as a function of the propagation direction by ±45°. In this example, a linear input polarization is used in the phase shifter. The Faraday rotators 132, 134 at the inputs of the phase shifter 105 ensure that laser light running on the left and right has orthogonal polarization states at the location of the phase modulator 130, which correspond with the optical axes of the phase modulator 130. In combination with the polarization dependence of the phase modulator 130, a phase shift of the laser beam results which is dependent on the propagation direction. The polarization states are then each rotated back at the second Faraday rotator. The polarization state is thus maintained before and after exit from the phase shifter 105.

The circulation direction of the light determines whether a phase deviation occurs due to the phase shifter 105 or not. Since the path length of the two circulation directions is identical and the optical signals propagate having the same polarization direction through the optical ring, phase fluctuations due to external influences (thermal or mechanical)

are compensated for. The relative phase φ between the circulation directions, which is introduced by the phase shifter 105, subsequently changes into a phase difference between the horizontal (H) and vertical (V) polarization component. This enables a polarization check of the output light ($\vec{E}_{out}=(e^{i\phi}/\sqrt{2})(\vec{E}_H+e^{i\varphi}\vec{E}_V)$) with respect to the diagonal input polarization ($\vec{E}_{in}=(1/\sqrt{2})(\vec{E}_H+\vec{E}_V)$) of the light in the optical ring. The global phase φ, which is introduced by the structure on the light state, has no influence on the polarization. The relative phase is controllable via the modulation signal of the phase modulator 130.

The phase modulator 130 modulates a polarization component in that the polarization component having the corresponding polarization direction is changed in its phase.

Figure 4:
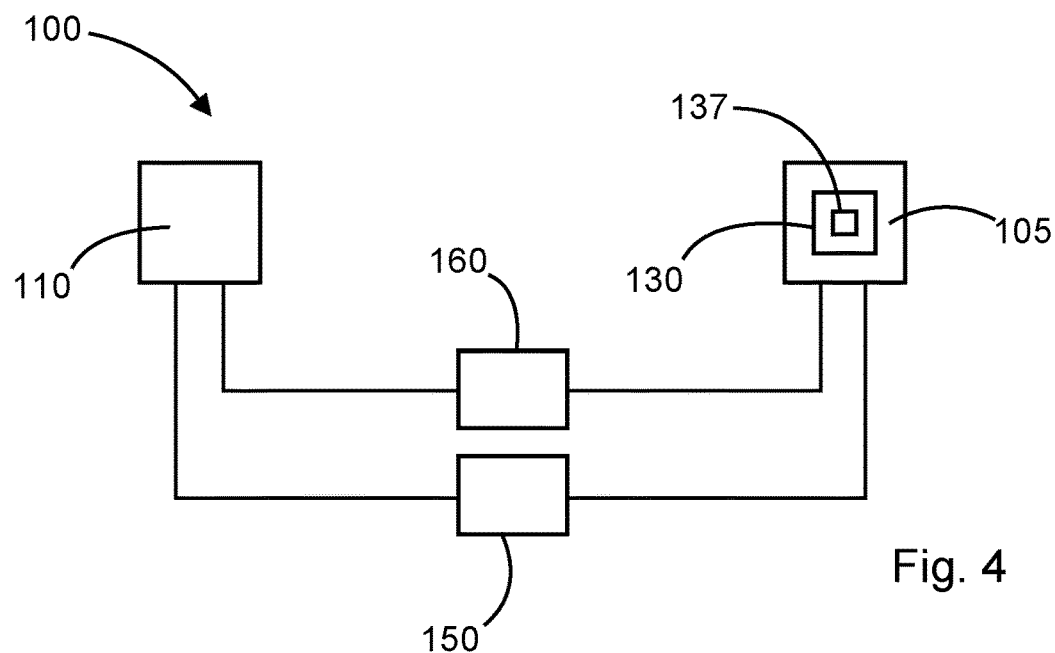
FIG. 4 shows a schematic illustration of a modulator unit.

FIG. 4 shows how the components of the modulator unit 100 are activated to introduce the information to be transmitted into the polarization of the optical signal.

The modulator unit 100 contains an energy supply 160 and a control unit 150. Both the energy supply 160 and the control unit 150 are connected to the light source 110 and the polarization module 105 as well as its components (phase modulator 130, crystal 137 contained therein). The control unit 150 can also be connected directly to the energy supply 160, however, in order to specify an electrical voltage output by the energy supply 160 at the respective terminal.

The energy supply 160 supplies the light source 110 with electrical energy, so that the light source generates the optical signal, which functions as the input signal. Furthermore, the energy supply 160 supplies the phase modulator 130 with electrical energy, for example, an electrical voltage which is applied at the crystal 137. This electrical voltage influences the crystal 137 such that the phase of a component of a passing optical signal polarized in a specific manner is changed. For example, variations of the electrical voltage can change the phase by different strengths.

The control unit 150 is designed to activate the energy supply 160 and/or each individual one of the components 110, 130 so that these components are supplied with the energy required for their function. For this purpose, the control unit 150 can send control commands to the components 110, 130 and/or control commands to the energy supply 160.

Figure 5:
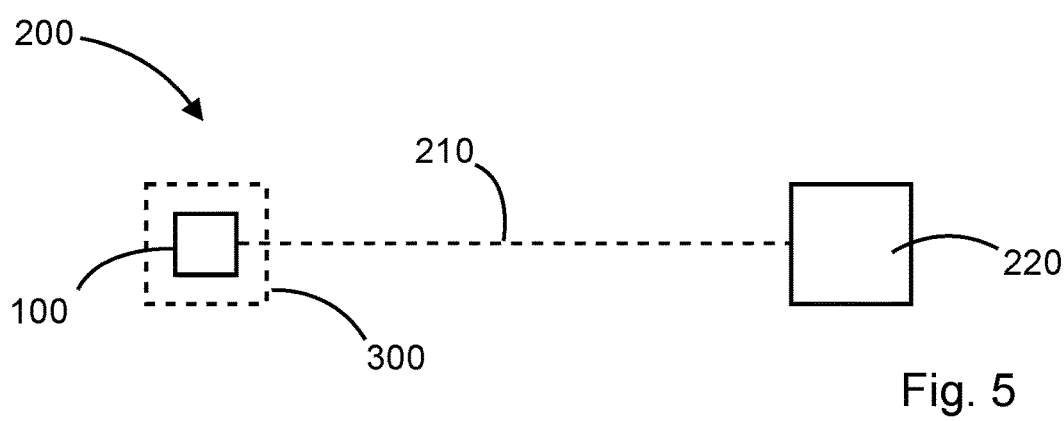
FIG. 5 shows a schematic illustration of an optical signal transmission link.

FIG. 5 shows an optical signal transmission link 200. A modulator unit 100 functions as a signal source or transmitter. The modulator unit 100 modulates the polarization of an optical signal as described above and transmits the modulated optical signal via a transmission path 210. The transmission path 210 is, for example, a wireless optical path.

The modulated optical signal is received by a remote station and processed. The remote station is the receiver 220. The modulator unit 100 can be arranged on board a satellite. The receiver 220 can be arranged on the Earth's surface or on board another satellite.

In addition, it is to be noted that "comprising" or "including" does not exclude other elements or steps and "a" or "one" does not exclude a plurality. Furthermore, it is to be noted that features or steps which have been described with reference to one of the above exemplary embodiments can also be used in combination with other features or steps of other exemplary embodiments described above. Reference signs in the claims are not to be viewed as a restriction.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

LIST OF REFERENCE SIGNS 100 modulator unit
105 phase shifter
106 first terminal
107 second terminal
110 light source
111 input signal
112 split input signal
113A first polarization component having first polarization direction
113B second polarization component having second polarization direction
114A first polarization component having second polarization direction
114B second polarization component having second polarization direction
115A first polarization component having second polarization direction
115B second polarization component having first polarization direction
116 superimposed optical signal
118 output signal
120 feed unit, non-polarizing beam splitter or circulator
122 polarizing beam splitter
123 polarization rotator (half-wave plate or optical waveguide)
130 polarization-dependent phase modulator, electro-optical modulator
132 first Faraday rotator
133 first magnetic field
134 second Faraday rotator
135 second magnetic field
137 crystal
150 control unit
160 energy supply
170 first optical partial link
171 second optical partial link
200 optical signal transmission link
210 transmission path, optical signal
220 receiver
300 satellite

The invention claimed is:

1. A modulator unit for modulating the phase of a polarization component of an optical signal, comprising:
   a light source;
   a polarizing beam splitter; and
   a phase shifter;
   wherein the light source is configured to output an optical signal and emit the output signal as an input signal in the direction of the polarizing beam splitter, wherein the optical signal contains a first polarization component having a first polarization direction and a second polarization component having a second polarization direction;

wherein the polarizing beam splitter is configured to split the input signal into the first polarization component and the second polarization component, to conduct the first polarization component via a first optical partial link in a first direction to the phase shifter, and to conduct the second polarization component via a second optical partial link in a second direction to the phase shifter, wherein the second direction is opposite to the first direction, so that the first polarization component and the second polarization component pass through the phase shifter in opposite directions;

wherein the first optical partial link or the second optical partial link contains a polarization rotator, configured to change a polarization direction of optical signals that pass the polarization rotator such that the first polarization component has the same polarization direction as the second polarization component when the first polarization component and the second polarization component are incident on the phase shifter;

wherein the phase shifter includes a first Faraday rotator, a second Faraday rotator, and a polarization-dependent phase modulator;

wherein the polarization-dependent phase modulator is arranged along an optical path through the phase shifter between the first Faraday rotator and the second Faraday rotator;

wherein the first optical partial link is optically coupled to the first Faraday rotator and the second optical partial link is optically coupled to the second Faraday rotator;

wherein the first Faraday rotator is configured to change a polarization direction of passing optical signals in a first polarization change direction;

wherein the second Faraday rotator is configured to change a polarization direction of passing optical signals in a second polarization change direction;

wherein the second polarization change direction is different from the first polarization change direction, so that the first polarization component and the second polarization component, when they pass the polarization-dependent phase modulator, are polarized in polarization directions perpendicular to one another;

wherein the polarization-dependent phase modulator is configured to execute a phase modulation of only one polarization component; and wherein the polarizing beam splitter is arranged to receive the first polarization component via the second optical partial link and to receive the second polarization component via the first optical partial link, and to combine the first polarization component and the second polarization component to form a superimposed optical signal.

2. The modulator unit according to claim 1,
wherein the first Faraday rotator is configured to change the polarization direction of passing optical signals in the first polarization change direction by 45°;
wherein the second Faraday rotator is configured to change the polarization direction of passing optical signals in the second polarization change direction by 45°; and
wherein the first polarization change direction is opposite to the second polarization change direction.

3. The modulator unit according to claim 1,
wherein the polarization rotator is a half-wave plate or an optical waveguide and is arranged and configured such that the polarization rotator changes the polarization direction of the passing optical signal.

4. The modulator unit according to claim 1,
wherein the first optical partial link and/or the second optical partial link is implemented as a free space structure or as an optical waveguide.

5. The modulator unit according to claim 1,
wherein the polarization-dependent phase modulator comprises a crystal, configured to be subjected to an electrical voltage and to change its index of refraction, by which the phase of the first polarization component of the optical signal is changed.

6. The modulator unit according to claim 5,
wherein the modulator unit is configured to vary the electrical voltage applied at the crystal over time.

7. The modulator unit according to claim 1,
wherein the light source is configured to output light having a defined optical mode.

8. The modulator unit according to claim 1,
wherein the modulator unit is configured to activate the light source such that the light source emits continuous or pulsed optical signals.

9. An optical signal transmission link comprising:
a modulator unit according to claim 1; and
a receiver configured to receive optical signals;
wherein the modulator unit is arranged to emit the output signal in the direction of the receiver.

10. A satellite comprising a modulator unit according to claim 1.

* * * * *